United States Patent Office 3,358,021
Patented Dec. 12, 1967

3,358,021
TRIPHENYLPHOSPHINIMINE DIHALOPHOSPHATES AND THEIR PRODUCTION
Rolf Appel, Bonn, Germany, assignor to Olin Mathieson Chemical Corporation, a corporation of Virginia
No Drawing. Filed Dec. 13, 1963, Ser. No. 330,265
4 Claims. (Cl. 260—543)

This invention relates to novel compounds of the formula $A_3P:N.POX_2$ in which A is phenyl and X is selected from the group consisting of chlorine and bromine and to a novel process of preparing them.

The novel compounds are prepared by reaction of water with trihalo-triphenylphosphiniminium halides of the formula $[A_3P:N.PX_3]X$ in which A and X mean the same as defined above. The trihalo-halides are prepared as described by Appel and Büchler, Z. anorg. allgem. Chem. 320, 3–10 (Jan. 1963).

A suitable starting material, for example, is trichloro-triphenylphosphiniminium bromide, $[(C_6H_5)_3P:N.Cl_3]Br$, from N-bromotriphenylphosphinimine and $PCl_3$, is hydrolyzed according to the process of this invention to triphenylphosphinimine dichlorophosphate in Examples I and III below. Tribromo-triphenylphosphiniminium bromide, $[(C_6H_5)_3P:N.PBr_3]Br$, from N-bromotriphenylphosphinimine and $PBr_3$, is hydrolyzed according to the process of this invention to triphenylphosphinimine dibromophosphate in Example II below. Also the trichlorochloride, $[(C_6H_5)_3P:N.PCl_3]Cl$ and the trichloro-iodide, $[(C_6H_5)_3P:N.PCl_3]I$, yields the dichlorophosphate, $(C_6H_5)_3P:NPOCl_2$.

The reaction with water is carried out with the water vapor in moist air by exposing the starting material thereto at room temperature for one to 3 days. Slightly elevated temperatures, to 50° C. accelerate the reaction. Alternatively, substantially the stoichiometric amount of water is dissolved in a suitable solvent, e.g., acetonitrile and the starting material is dissolved or slurried in the wet acetonitrile at ice-water temperatures or higher for a few minutes. The stoichiometric amount of water is one mole per mole of starting material. Thus the reaction is carried out at 0° to 50° C. for 1 minute to 3 days depending on conditions.

The triphenylphosphinimine dihalophosphates of this invention are useful for the preparation of insecticidal esters. Thus triphenylphosphinimine dichlorophosphate reacts with sodium methylate to form dimethyl triphenylphosphinimine phosphate.

Example I

A small quantity of trichloro-triphenyl-phosphiniminium bromide, $[(C_6H_5)_3P:N.PCl_3]Br$ was hydrolyzed by standing in a flat open dish in moist air at room temperature for 2 days. Yield: 6.8 g. The resulting triphenylphosphinimine dichlorophosphate was crystallized from acetonitrile as cubes or needles melting at 186° C. Yield: 3.5 g.

Analysis.—$C_{18}H_{15}NOP_2Cl_2$ (394.2): Calc: 54.84, C; 3.83, H; 3.55, N; 15.71, P; 17.98, Cl. Found: 54.69, C; 4.07, H; 3.64, N; 15.48, P; 17.98, Cl.

Example II

From 4.7 g. of tribromo-triphenylphosphiniminium bromide $[(C_6H_5)_3P:N.PBr_3]Br$ hydrolyzed in moist air as described in Example I was obtained 3.8 g. crude triphenylphosphinimine dibromophosphate. The product was twice recrystallized from 30 ml. of acetonitrile to obtain 1.6 g. of pure product melting at 182–184° C.

Analysis.—$C_{18}H_{15}NOP_2Br_2$ (483.1): Calc: 44.75; 3.12, H; 12.82, P; 2.89, N; 33.08, Br. Found: 44.93, C; 3.23, H; 12.92, P; 3.10, N; 32.90, Br.

Example III

A small quantity of trichloro-triphenylphosphiniminium bromide was digested with ice-cold acetonitrile containing the calculated amount of water. After a few minutes the triphenylphosphinimine dichlorophosphate was removed and recrystallized from acetonitrile. It was identical with the product of Example I.

What is claimed is:
1. Compounds of the formula $A_3P:N.POX_2$ in which A is phenyl and X is selected from the group consisting of chlorine and bromine.
2. Process for preparing a compound of the formula $A_3P:N.POX_2$ in which A is phenyl and X is selected from the group consisting of chlorine and bromine by reacting a trihalo-halide of the formula $[A_3P:N.PX_3]X$ with water at a temperature of 0° to 50° C. for 1 minute to 3 days.
3. Process of claim 2 in which the water is present as water vapor in moist air.
4. Process of claim 2 in which the water in substantially stoichiometric amount is dissolved in acetonitrile.

No references cited.

LORRAINE A. WEINBERGER, Primary Examiner.
H. C. WEGNER, Assistant Examiner.

UNITED STATES PATENT OFFICE
CERTIFICATE OF CORRECTION

Patent No. 3,358,021     December 12, 1967

Rolf Appel

It is hereby certified that error appears in the above numbered patent requiring correction and that the said Letters Patent should read as corrected below.

Column 1, line 19, for "$[(C_6H_5)_3P:N.Cl_3]Br$" read -- $[(C_6H_5)_3P:N.PCl_3]Br$ --; column 2, line 19, after "44.75" insert -- , C --.

Signed and sealed this 31st day of December 1968.

(SEAL)
Attest:

Edward M. Fletcher, Jr.
Attesting Officer

EDWARD J. BRENNER
Commissioner of Patents